(12) United States Patent
Maligne et al.

(10) Patent No.: US 7,234,384 B2
(45) Date of Patent: Jun. 26, 2007

(54) PNEUMATIC BOOSTER WITH SHIFTED VALVE SEATS

(75) Inventors: Jean-Charles Maligne, Aubervilliers (FR); Ulysse Verbo, Sant Cugat (ES); Philippe Richard, Chelles (FR)

(73) Assignee: Robert Bosch Corporation GmbH, Stuttgart (DE)

( * ) Notice: Subject to any disclaimer, the term of this patent is extended or adjusted under 35 U.S.C. 154(b) by 0 days.

(21) Appl. No.: 11/331,936

(22) Filed: Jan. 13, 2006

(65) Prior Publication Data

US 2006/0169129 A1    Aug. 3, 2006

(30) Foreign Application Priority Data

Feb. 2, 2005    (FR) .................................. 05 01178

(51) Int. Cl.
*F15B 9/10*    (2006.01)

(52) U.S. Cl. .................... 91/369.2; 91/376 R (58) Field of Classification Search .............. 91/369.1, 91/369.2, 369.3, 376 R
See application file for complete search history.

(56) References Cited

U.S. PATENT DOCUMENTS 5,579,675 A * 12/1996 Gautier et al. ............. 91/369.2

* cited by examiner

*Primary Examiner*—Michael Leslie
(74) *Attorney, Agent, or Firm*—Leo H. McCormick, Jr.; Sarah Taylor (57) ABSTRACT

A pneumatic brake booster (10) for a motor vehicle comprising a casing (12) within a moving partition (14) is secured to a moving piston (12) having an inlet valve (52) and a re-equalizing valve (50) with offset seats borne by first (136) and second (142) tubular sleeves, The first sleeve (136) is slideably mounted in the moving piston (22) with a travel (d) which is determined by first bayonet-fitting (154) that is interposed between the first sleeve (136) and the moving piston (22) and that are locked against rotation by the second sleeve (142).

11 Claims, 7 Drawing Sheets

PNEUMATIC BOOSTER WITH SHIFTED VALVE SEATS

The invention relates to a pneumatic brake booster for a motor vehicle.

BACKGROUND OF THE INVENTION

The invention relates more particularly to a pneumatic brake booster for a motor vehicle, of the type which comprises a rigid casing inside which there can move a transverse partition delimiting in a sealed manner a front chamber, subjected to a first pressure, and a rear chamber, subjected to a second pressure that varies between the first pressure and a pressure higher-than the first pressure, which is able to act on an actuating rod of a master cylinder associated with the booster via a reaction disk, of the type which comprises a tubular moving piston which is slideably mounted in the casing and is secured to the moving partition, of the type which comprises a control rod moving in the piston selectively as a function of an axial input force directed forward against the action of a return force exerted on the rod by a return spring, of the type in which the movements of the control rod are able to determine the openings and closings of at least one axial "inlet" valve which is interposed between a pressure source subjected to the pressure higher than the first pressure and the rear chamber and of at least one axial "re-equalizing" valve that is axially offset with respect to the inlet valve, which is interposed between the front chamber and the rear chamber, to actuate the moving partition, and of the type in which a plunger, slideably mounted in the piston, passing through the moving partition and secured to the end of the control rod, is able to act directly upon the actuating rod of the master cylinder via the reaction disk, of the type which comprises:
- a first transverse sealing element for the axial inlet valve, secured to the rear end of the plunger,
- a first complementary transverse sealing element for the axial re-equalizing valve, consisting of at least one portion of the rear face of the moving partition.

Numerous examples of boosters of the aforementioned type are known.

In such boosters, the first transverse sealing element for the axial inlet valve generally consists of a cup crimped on to a cylindrical surface of the rear end of the plunger. Fitting this cup presents major difficulties when the booster is being manufactured.

This is because this cup needs to be fixed to the plunger in a given axial position in order to guarantee satisfactory opening of the inlet valve.

Now, crimping operations generally lead to the introduction of axial clearances which are detrimental to the observance of strict axial positioning of said cup with respect to the plunger.

SUMMARY OF THE INVENTION

To remedy this disadvantage, the invention proposes a novel booster design in which the first transverse sealing element for the axial inlet valve can be mounted in a unique axial position relative to the plunger.

To this end, the invention proposes a booster of the aforementioned type, characterized in that it comprises:
- a first tubular sleeve, fixed around the plunger in the moving piston, which is returned elastically away from the moving partition, a transverse face of which comprises the first transverse sealing element for the axial inlet valve,
- a floating second tubular sleeve, surrounding the first sleeve, which is axially mobile with respect to the moving piston, which is returned elastically towards the moving partition, a rear internal transverse face of which comprises a complementary second sealing element for the axial inlet valve, and a front external transverse face of which comprises a complementary external second sealing element for the re-equalizing valve, the first sleeve being slideably mounted in the moving piston with a travel which is determined by first bayonet-fitting means interposed between said first sleeve and the moving piston and which are locked against rotation by the second sleeve.

According to other features of the invention:
- the moving piston comprises a tubular guiding surface interposed radially between the first sleeve and the second sleeve,
- the tubular surface comprises a slot opening radially on each side of said tubular surface and opening axially towards the rear of the surface, which is intended to collaborate with an outwardly radially projecting finger of the first sleeve to form the first bayonet-fitting means and which is intended to collaborate with an inwardly radially projecting rib of the second sleeve to lock said first bayonet-fitting means,
- the slot comprises:
  - a first track of a width corresponding to the width of the finger and/or of the rib, which opens to the rear of the tubular surface of the moving piston,
  - a second track, communicating with the first track, having an edge in common with the first track and the width of which corresponds to twice the width of the finger or of the rib and which is intended to accept the finger and the rib in order to lock said finger angularly,
- the second sleeve comprises a front end flange, a transverse face of which comprises the complementary second transverse sealing element for the axial re-equalizing valve which is intended to shut off at least one passage duct passing through the moving partition, the rear end of which comprises the first transverse sealing element for the axial re-equalizing valve,
- the front flange comprises, forward of its transverse face, an annular peripheral edge which accepts a washer immobilized by second bayonet-fitting means,
- the annular peripheral edge of the flange comprises at least three radial stubs which face inwards and are uniformly angularly distributed, and the washer comprises at least three complementary radial stubs which face outwards and are uniformly angularly distributed to form the second bayonet-fitting means,
- the first sealing element for the axial inlet valve consists of the exterior rear transverse face of the first sleeve,
- the second sealing element for the axial inlet valve consists of an annular seal fixed to an internal front face in a rear wall of the tubular second sleeve,
- the first sealing element for the axial re-equalizing valve consists of at least a periphery of the rear end of the passage duct passing through the moving partition,
- the rear end of the plunger comprises a convex frusto-conical surface intended to collaborate with a concave frustoconical surface belonging to the first sleeve in order to provide a given axial position for fixing the first sleeve to the plunger.

Other characteristics and advantages of the invention will become apparent from reading the detailed description which follows, for an understanding of which reference will be made to the attached drawings.

DETAILED DESCRIPTION OF THE INVENTION

In the description which will follow, identical reference numerals denote parts which are identical or have similar functions.

By convention, the terms "front", "rear", "upper" and "lower" respectively denote elements or positions directed to the left, to the right, to the top or to the bottom of FIGS. 1 to 6 respectively.

Figure 1:
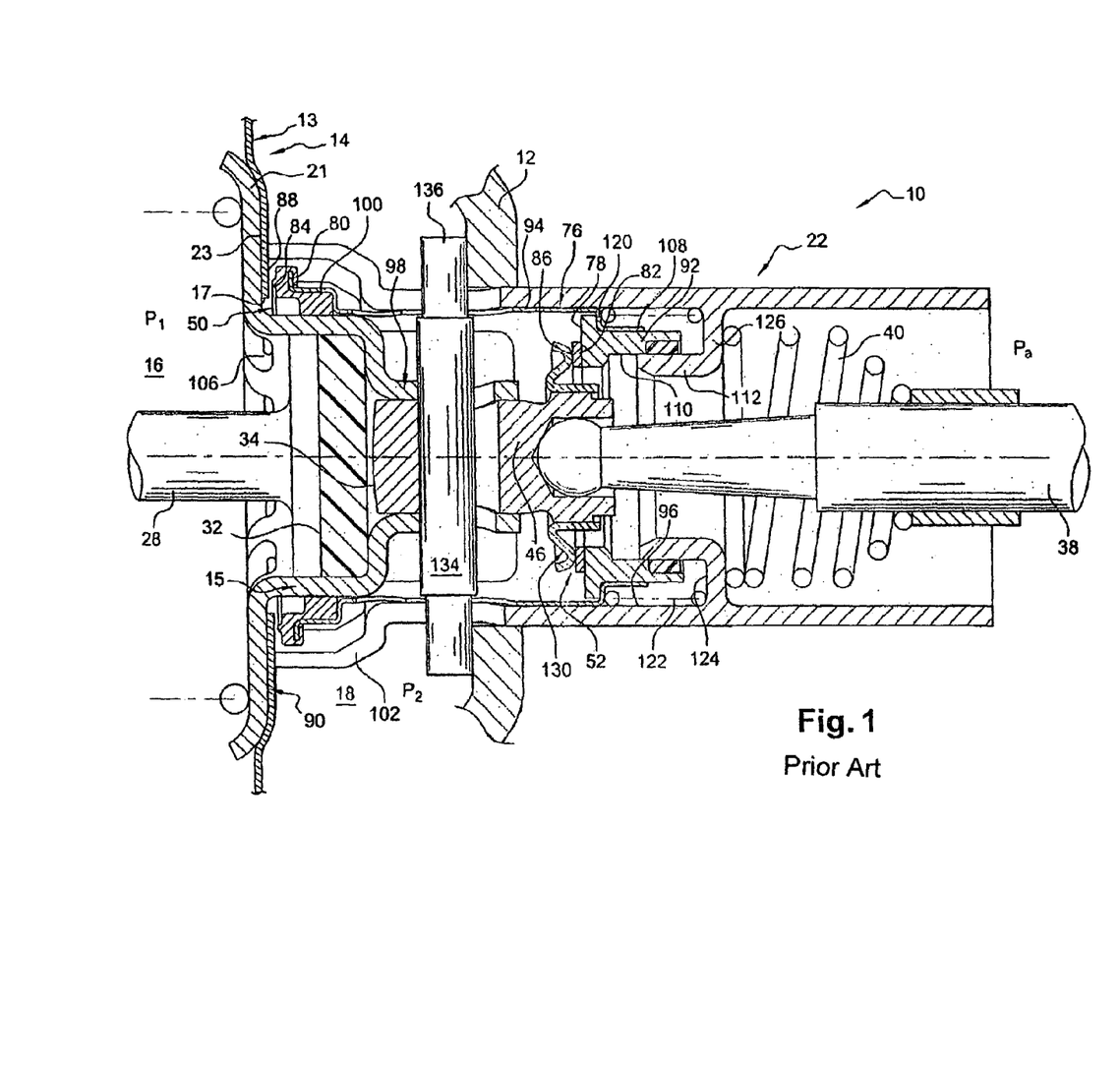
FIG. 1 is a detailed view of a booster according to a prior state of the art.

FIG. 1 depicts details of a conventional pneumatic brake booster 10 for a motor vehicle.

In a known way, such a booster 10 comprises a rigid casing 12 inside which there can move a transverse partition 14 delimiting, in sealed fashion, a front chamber 16, subjected to a first pressure "$P_1$", and a rear chamber 18, subjected to a second pressure "$P_2$" varying between the first pressure "$P_1$" and a pressure "$P_a$" higher than the first pressure "$P_1$", which is able to act on an actuating rod 28 of a master cylinder (not depicted) which is associated with the booster 10 via a reaction disk 32.

In a known way, the booster 10 comprises a tubular moving piston 22 slideably mounted in the casing and secured to the moving partition 14. The booster 10 comprises a control rod 38 moving in the piston 22 selectively as a function of an axial input force exerted forward against the action of a return force exerted on the rod 38 via a return spring 40.

The movements of the control rod 38 are able to determine the openings and closings of at least one axial "inlet" valve 52 which is interposed between a pressure source subjected to the pressure "$P_a$" higher than the first pressure "$P_1$" and the rear chamber 18, and of at least one axial "re-equalizing" valve 50 which is axially offset relative to the inlet valve 52, which is interposed between the front chamber 16 and the rear chamber 18 to actuate the moving partition 14.

A plunger 46 secured to the end of the control rod 38 is slideably mounted in the piston 22 and passes through the moving partition 14. This plunger 46 comprises an end 34 shaped as a feeler, passing through the moving piston 22, which is able to act directly on the actuating rod 28 of the master cylinder via the reaction disk 32.

The rear end of the plunger 46 comprises a first transverse sealing element 86 for the axial inlet valve 52, and at least one portion of the rear face 90 of the moving partition comprises a complementary first transverse sealing element 88 for the axial re-equalizing valve 50.

Furthermore, the booster 10 comprises a floating tubular element 76, external to the plunger 46, which can move axially and is returned elastically towards the moving partition 14. Axially offset transverse faces 78, 80 of the element 76 respectively comprise complementary second sealing elements 82, 84 for the axial inlet 52 and re-equalizing 50 valves.

Furthermore, the moving partition 14 comprises an external skirt 13, a portion of the rear face 90 of which comprises the complementary first transverse sealing element 88 for the axial re-equalizing valve 50 and a tubular internal sleeve tube 15 mounted through a hole 17 in the external skirt 13 to which it is secured, which accepts the reaction disk 32, and in which the plunger 46 is slideably mounted.

The tubular internal sleeve tube 15 comprises a rear tubular surface 98 which passes through the hole 17 in the skirt 13 and a transverse front fixing flange 21 which is fixed, for example by welding, to a front face 23 of the skirt 13.

The second sealing element 82 for the axial inlet valve 52 consists of a seal borne by an attached tubular sleeve 92 which is slideably mounted in the rear end of the floating tubular element 76.

The floating tubular element 76 comprises a tubular intermediate portion 94 which is slideably mounted in an intermediate portion 96 of the substantially cylindrical piston 22 and around the tubular surface 98 of the tubular internal sleeve tube 15 and which slideably accepts the plunger 46. The tubular surface 98 extends substantially axially from the rear face 90 of the skirt 13 of the moving partition 14.

The floating tubular element 76 also comprises a front end tubular section 100, of a diameter greater than the diameter of the intermediate portion 94, which is housed in a perforated front portion 102 of the piston 22 which is positioned where the piston 22 and the moving partition meet. The front portion 100 internally accepts a seal, a front face of which forms the second sealing element 84 for the re-equalizing valve 50. The second sealing element 84 is intended to collaborate with the portion 88 of the rear face 90 of the skirt 13, forming the first sealing element of the re-equalizing valve 50, which is arranged radially on the outside of a plurality of communication holes 106 providing communication between the front chamber 16 and the rear chamber 18 made in the interior tubular sleeve tube 15 and therefore radially on the outside of the hole 17 in the skirt 13, in order to interrupt communication between the front 16 and rear 18 chambers.

The floating tubular element 76 finally comprises a rear end tubular portion 108, of a diameter smaller than the diameter of the intermediate portion 94, which internally accepts the tubular sleeve 92, the front end transverse face 78 of which bears the seal 82 forming the second sealing element 82 for the inlet valve 52, which is intended to collaborate with the first sealing element 86 borne by the plunger 46. A bore 110 of the sleeve 92 sealingly surrounds an axial inlet duct 112 of the piston 22 communicating with the pressure source subjected to the pressure "$P_a$" higher than the first pressure "$P_1$".

Advantageously, in order to return the element 76 elastically towards the moving partition 14, a shoulder face 120 delimiting the intermediate tubular portion 94 and the rear end tubular portion 108 of the tubular element has, bearing against it, the end of a return spring 122, the other end of which bears against a shoulder face 124 of the tubular piston 22.

The intermediate section 96 of the piston 22, of a given diameter, comprises the inlet duct 112, of a diameter smaller than the given diameter, with which it is formed as an integral part, and the inlet duct 112 is connected to the intermediate portion 96 via a transverse wall 126 formed as an integral part, a front face of which forms the shoulder face 124 against which the tubular element return spring 122 bears and the rear face of which forms a shoulder face 128 against which the return spring 40 that returns the control rod 38 bears.

In its rest position, the plunger 46 is returned against end stops by way of a radial stop pin 134, of which the ends 136 external to the piston 22 are able to bear against the casing 12 of the booster 10. The pin 134 passes through the plunger 46, the tubular surface 98 of the tubular internal sleeve tube 15, the element 76 and two diametrically opposed slots in the piston 22 which in addition allow air to pass from the rear chamber 18 to the front chamber 16 when the re-equalizing valve 50 is open, or allow air to pass from the external surroundings coming from the duct 112 when the inlet valve 52 is open.

The first transverse sealing element 86 for the axial inlet valve consists of a rear face of a cup 130 which is tightly mounted, for example during a crimping operation, on the rear end of the cylindrical plunger 46.

The transverse rear face 86 of the cup 130 forming the first sealing element for the inlet valve 52 extends opposite the seal 82 that forms the second transverse sealing element.

Since the way in which such a booster 10 works is known from the prior art, this will not be described in detail in the remainder of the present description.

The disadvantage of such a booster 10 is that mounting the cup 130 presents major difficulties when the booster 10 is being assembled.

This is because this cup has to be fixed to the plunger 46 in a given axial position in order to guarantee satisfactory opening of the inlet valve 52.

Now, crimping operations generally introduce axial clearances which are detrimental to the observance of strict axial positioning of said cup 130 with respect to the plunger 46.

To remedy this disadvantage, the invention proposes a novel design of booster 10 in which design the first transverse sealing element 82 for the axial inlet valve 52 can be mounted in a unique axial position relative to the plunger 46.

Figure 4:
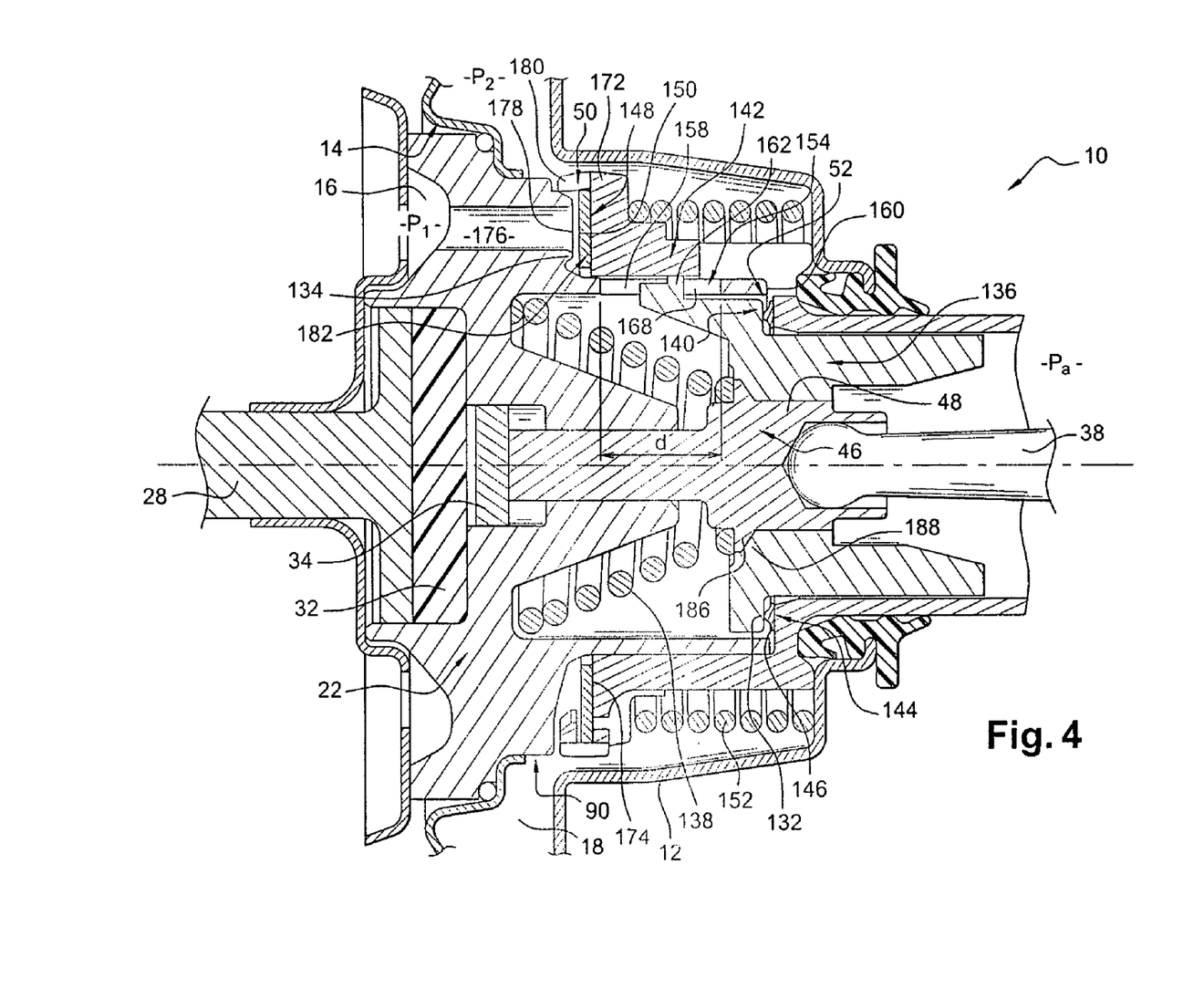
FIG. 4 is a view in axial section illustrating the way in which the booster works in a rest or released position, with the inlet valve closed and the re-equalizing valve open.
Figure 5:
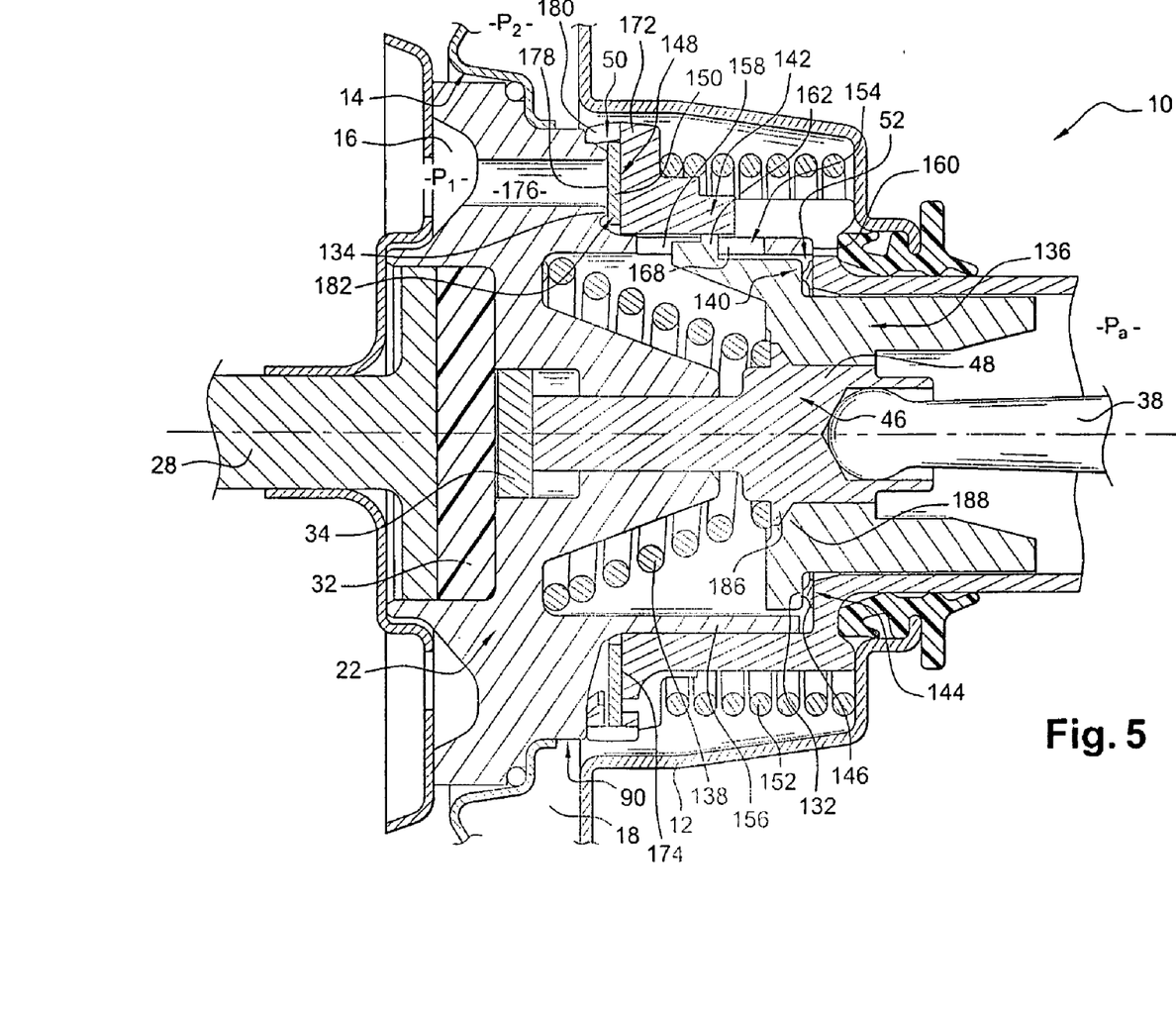
FIG. 5 is a view in axial section illustrating the way in which the booster works in a position in preparation for the application of a braking force, with the inlet valve closed and the re-equalizing valve closed.
Figure 6:
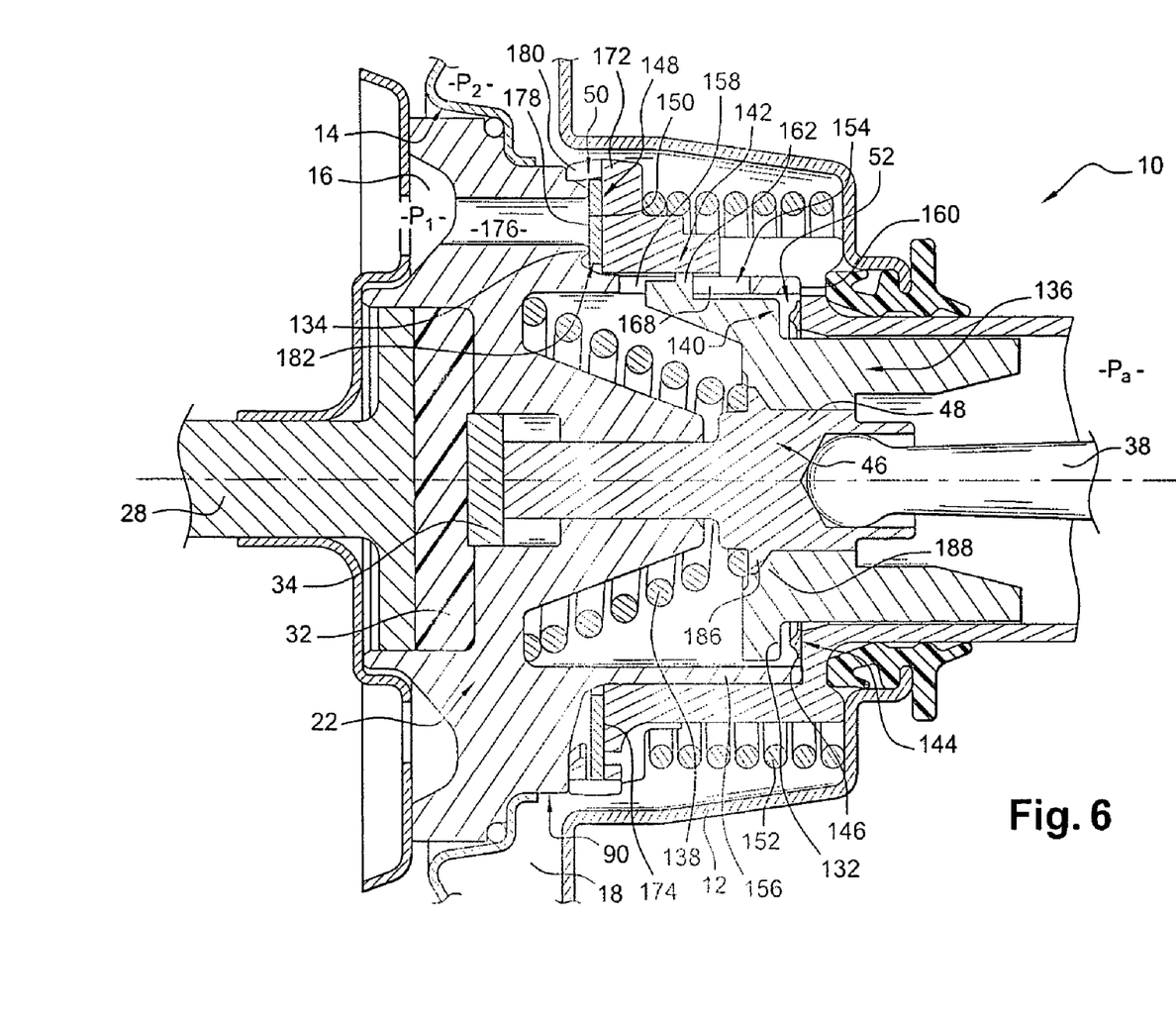
FIG. 6 is a view in axial section illustrating the way in which the booster works in a position for the application of a braking force, with the inlet valve open and the re-equalizing valve closed.

To this end, as FIGS. 4 to 6 illustrate, the invention proposes a booster 10 relying on a tubular design similar to that of the prior art. In a similar way to the booster 10 already described, the booster 10 according to the invention comprises a first transverse sealing element 132 for the axial inlet valve 52, secured to the rear end 48 of the plunger 46, and a complementary first transverse sealing element 134 for the axial re-equalizing valve 50, consisting of at least a portion of the rear face 90 of the moving partition 14.

However, according to the invention, the booster 10 comprises:
  a first tubular sleeve 136, fixed around the plunger 46 in the moving piston 22, which is returned elastically away from the moving partition 14, for example by a return spring 138, a transverse face 140 of which comprises the first transverse sealing element 132 for the axial inlet valve 52,
  a floating second tubular sleeve 142, surrounding the first sleeve 136, which is axially mobile with respect to the moving piston 22, which is returned elastically towards the moving partition 14, a rear internal transverse face 144 of which comprises a complementary second sealing element 146 for the axial inlet valve, and a front external transverse face 148 of which comprises a complementary external second sealing element 150 for the re-equalizing valve 50.

The second sleeve 142 is returned towards the moving partition 14 by a return spring 152 which is arranged externally to said second sleeve 142 and which is interposed between the second sleeve 142 and the casing 12 of the booster 10.

The complementary second sealing element 146 for the axial inlet valve consists for example of a seal fixed to the rear internal transverse face 144 of the second sleeve 142.

The complementary external second sealing element 150 for the re-equalizing valve 50 will be described in greater detail later on in this description.

According to the invention, the first sleeve 136 is slideably mounted in the moving piston 22 with a travel "d" which is determined by first bayonet-fitting means 154 interposed between said first sleeve 136 and the moving piston 22 and which are locked against rotation by the second sleeve 142.

To guide the sliding of the sleeve 136, the moving piston 22 comprises a tubular guide surface 156 interposed radially between the first sleeve 136 and the second sleeve 142.

This tubular surface 156 comprises a slot 158 opening radially on each side of said tubular surface 156 and opening axially towards the rear 160 of the surface 156, which is intended to collaborate with an outwardly radially projecting finger 162 of the first sleeve 136 to form the first bayonet-fitting means 154.

The slot 158 is also intended to collaborate with a radially inwardly projecting rib 164 of the second sleeve to lock said first bayonet-fitting means 154.

Figure 2:
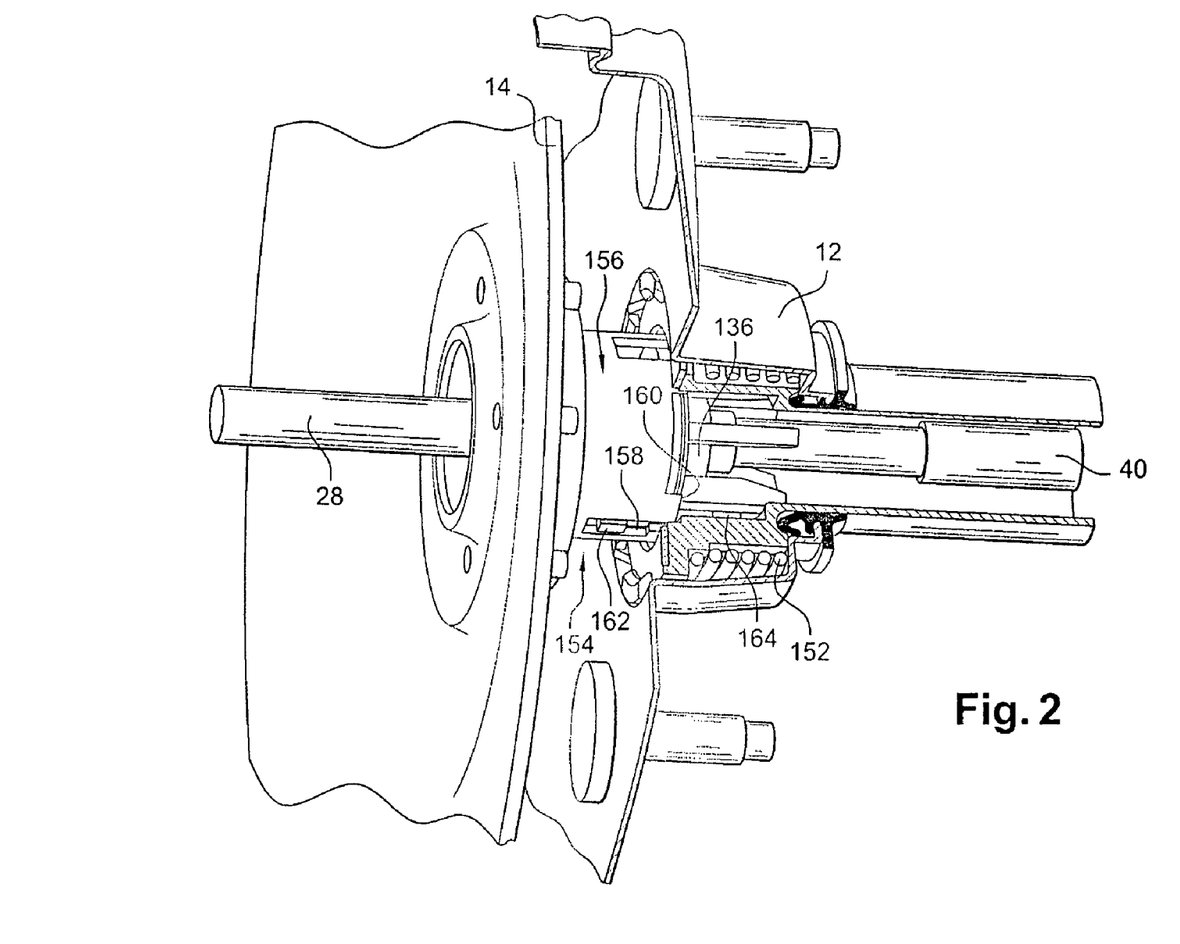
FIG. 2 is a detailed perspective view of a booster according to the invention, prior to its assembly.
Figure 3:
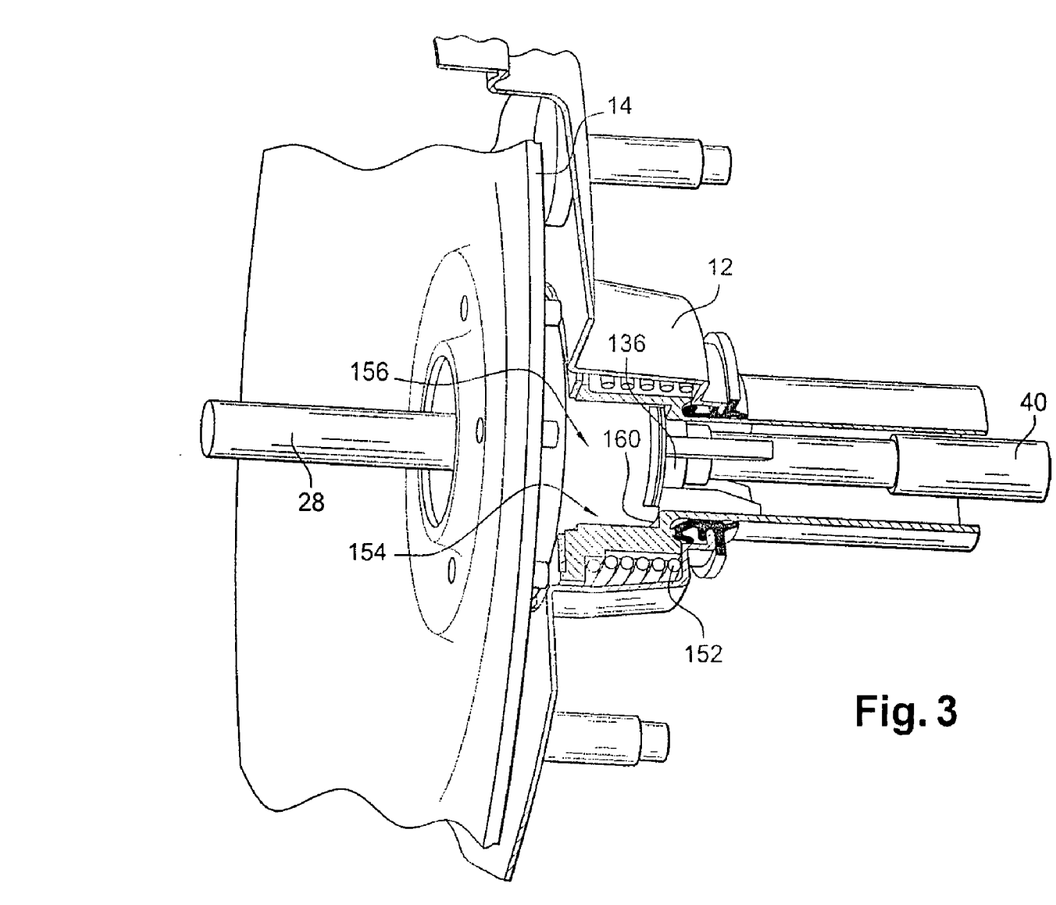
FIG. 3 is a detailed perspective view of a booster according to the invention after it has been assembled.
Figure 7:
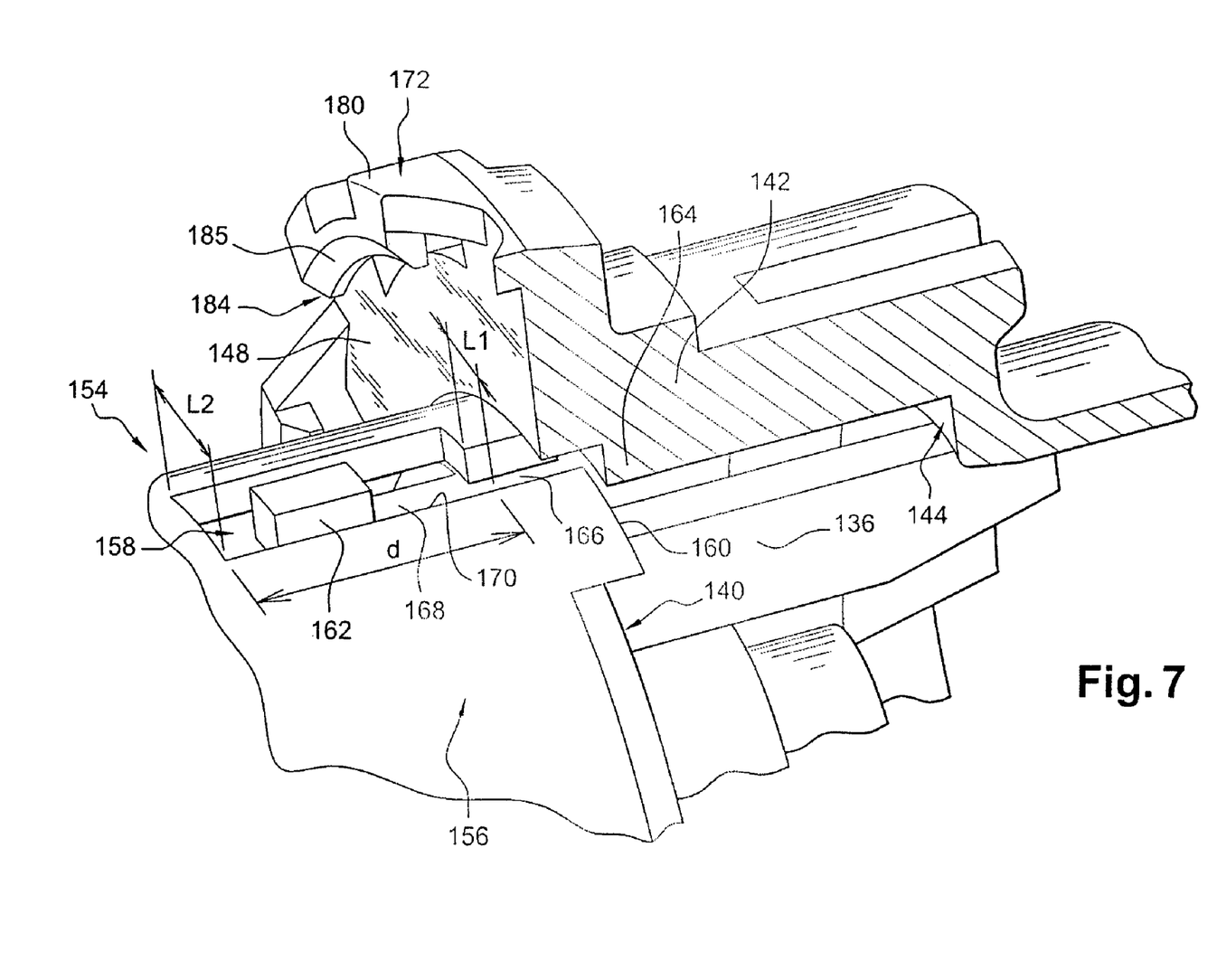
FIG. 7 is a detailed perspective view of the first bayonet-fitting means.

To this end, as illustrated by FIGS. 2 and 3 which depict the booster respectively before and after assembly of the bayonet-fitting means 154 and, more particularly, as illustrated by FIG. 7, the slot 158 comprises:
  a first track 166 of a width "L1" corresponding to the width of the finger 162 and/or of the rib 164, which opens to the rear 160 of the tubular surface 156 of the moving piston 22,
  a second track 168, communicating with the first track 166, having an edge 170 in common with the first track 166 and the width "L2" of which corresponds to twice the width "L1" of the finger 162 and/or of the rib 164 and which is intended to accept the finger 162 and the rib 164 in order to lock said finger 162 angularly. Once mounted, the finger 162 can move in the second track by its travel "d".

Advantageously, the second sleeve 142 comprises a front end flange 172, the external transverse face 148 of which comprises the complementary second transverse sealing element 150 for the axial re-equalizing valve 50 which is intended to shut off at least one passage duct 176 passing through the moving partition 14, the rear end 178 of which comprises the first transverse sealing element 134 for the axial re-equalizing valve 50.

More specifically, the first sealing element 134 for the axial re-equalizing valve consists of at least a periphery of the rear end 178 of the passage duct 176 passing through the moving partition 14.

Facing the duct 176, the front flange 172 comprises, forward of its transverse face 174, an annular peripheral edge 180 which accepts a washer 182 immobilized by second bayonet-fitting means 184.

To this end, the flange 172 comprises at least three radial lugs 185 facing inwards and uniformly angularly distributed, and the washer 182 comprises at least three complementary radial lugs (not depicted) facing outwards and uniformly angularly distributed, to form the second bayonet-fitting means 184.

As an alternative, the washer could equally have no complementary radial lugs and could be mounted directly by deformation between the radial lugs 185.

This design allows the sealing means for the re-equalizing valve 50 to be produced in a very simple way.

Similarly, the first sealing element 132 for the axial inlet valve 52 consists of the exterior rear transverse face 140 of the first sleeve 136.

Finally, to make it easier to fix the first sleeve 136 to the plunger 46 and precisely to determine its axial position relative to said plunger 46, the rear end 48 of the plunger 46 comprises a convex frustoconical surface 186 which is intended to collaborate with a concave frustoconical surface 188 belonging to the first sleeve 136. The first sleeve 136 is tightly mounted or screwed to the rear of the plunger 46.

In this configuration, the booster 10 can occupy three operating configurations as depicted in FIGS. 4 to 6. Starting out from the rest position in the figure in which the inlet valve 52 is closed and the re-equalizing valve 50 is open, the application of a braking force to the rod 38 causes a switch to a position in preparation for the application of a braking force, which position is associated with closure of the re-equalizing valve 50, the inlet valve 52 remaining closed, as depicted in FIG. 5.

Then, as force continues to be applied to the rod 38, the booster switches into a position for applying a braking force, as depicted in FIG. 6, in which the re-equalizing valve 50 remains closed and in which the inlet valve 52 opens.

Release of the control rod causes the inlet valve 52 to close then the re-equalizing valve to reopen to return to the rest position of FIG. 4.

The invention thus enables a simplification in the assembly of the first sealing element for the inlet valve 52 borne by the plunger while at the same time offering a booster 10 provided with offset inlet 52 and equalizing 50 seats which is particularly compact.

What is claimed is:

1. A pneumatic brake booster (10) for a motor vehicle, having a rigid casing (12) inside which there can move a transverse partition (14) delimiting in a sealed manner a front chamber (16), subjected to a first pressure ($P_1$), and a rear chamber (18), subjected to a second pressure ($P_2$) that varies between the first pressure ($P_1$) and a pressure ($P_a$) higher than the first pressure ($P_1$), acting on an actuating rod (28) of a master cylinder associated with the booster (10) via a reaction disk (32), a tubular moving piston (22) which is slideably mounted in the casing (12) and is secured to the moving partition (14), a control rod (38) moving in the piston (22) selectively as a function of an axial input force directed forward against the action of a return force exerted on the rod (38) by a return spring (138), movements of the control rod (38) determining the openings and closings of at least one axial inlet valve (52) which is interposed between a pressure source subjected to the pressure ($P_a$) higher than the first pressure ($P_1$) and the rear chamber (18) and of at least one axial re-equalizing valve (50) that is axially offset with respect to the inlet valve (52), which is interposed between the front chamber (16) and the rear chamber (18), to actuate the moving partition (14), and a plunger (46), slideably mounted in the piston (22), passing through the moving partition (14) and secured to the end of the control rod (38), to act directly upon the actuating rod (28) of the master cylinder via the reaction disk (32), a first transverse sealing element (132) for the axial inlet valve (52), secured to the rear end (48) of the plunger (46); and a first complementary transverse sealing element (134) for the axial re-equalizing valve (50), comprising at least one portion of the rear face (90) of the moving partition (14), the improvement comprising:

a first tubular sleeve (136), fixed around the plunger (46) in the moving piston (22), which is returned elastically away from the moving partition (14), a transverse face (140) of which comprises the first transverse sealing element (132) for the axial inlet valve (52), a floating second tubular sleeve (142), surrounding the first sleeve (136), which is axially mobile with respect to the moving piston, which is returned elastically towards the moving partition (14), a rear internal transverse face (144) of which comprises a complementary second sealing element (146) for the axial inlet valve (52), and a front external transverse face (148) of which comprises a complementary external second sealing element (150) for the re-equalizing valve (50), the first sleeve (136) being slideably mounted in the moving piston (22) with a travel (d) which is determined by first bayonet-fitting means (154) interposed between said first sleeve (136) and the moving piston (22) and which are locked against rotation by the second sleeve (142).

2. The booster (10) according to claim 1, characterized in that the moving piston (22) comprises a tubular guiding surface (156) interposed radially between the first sleeve (136) and the second sleeve (142).

3. The booster (10) according to claim 2, characterized in that the tubular surface (156) comprises a slot (158) opening radially on each side of said tubular surface (156) and opening axially towards the rear (160) of the surface (156), which is intended to collaborate with an outwardly radially projecting finger (162) of the first sleeve (136) to form the first bayonet-fitting means (154) and which is intended to collaborate with an inwardly radially projecting rib (164) of the second sleeve (142) to lock said first bayonet-fitting means (154).

4. The booster (10) according to claim 3, characterized in that the slot (158) comprises:

a first track (166) of a width corresponding to the width of the finger (162) and/or of the rib (164), which opens to the rear of the tubular surface (156) of the moving piston (22); and a second track (168), communicating with the first track (166), having an edge (170) in common with the first track and a width (L2) of the second track corresponds to twice the width (L1) of the finger (162) or of the rib (164) and which is intended to accept the finger (162) and the rib (164) in order to lock said finger (162) angularly.

5. The booster (10) according to claim 4, characterized in that the second sleeve (142) comprises a front end flange (172), the external transverse face (148) of which comprises the complementary second transverse sealing element (150) for the axial re-equalizing valve (50) which is intended to shut off at least one passage duct (176) passing through the moving partition, the rear end (178) of the at least one passage duct comprises the first transverse sealing element (134) for the axial re-equalizing valve (50).

6. The booster (10) according to claim 5, characterized in that the front flange (172) comprises, forward of its transverse face (148), an annular peripheral edge (180) which accepts a washer (182) immobilized by second bayonet-fitting means (184).

7. The booster (10) according to claim 6, characterized in that the annular peripheral edge (180) of the flange (172) comprises at least three radial stubs (185) which face inwards and are uniformly angularly distributed, and in that the washer (182) comprises at least three complementary radial stubs which face outwards and are uniformly angularly distributed to form the second bayonet-fitting means (184).

8. The booster (10) according to claim 7, characterized in that the first sealing element (132) for the axial inlet valve (52) consists of the exterior rear transverse face (140) of the first sleeve (136).

9. The booster (10) according to claim 8, characterized in that the second sealing element (146) for the axial inlet valve (52) consists of an annular seal fixed to the rear internal transverse face (144).

10. The booster (10) according to claim 9, characterized in that the first sealing element (134) for the axial re-equalizing valve comprising at least a periphery of the rear end (178) of the passage duct (176) passing through the moving partition (14).

11. The booster (10) according to claim 10, characterized in that the rear end (48) of the plunger (46) comprises a convex frustoconical surface (186) intended to collaborate with a concave frustoconical surface (188) belonging to the first sleeve in order to provide a given axial position for fixing the first sleeve (136) to the plunger (46).

* * * * *